United States Patent
Carpenter et al.

(10) Patent No.: US 7,481,241 B2
(45) Date of Patent: Jan. 27, 2009

(54) METHOD AND APPARATUS FOR A PRESSURE REGULATOR

(75) Inventors: Dale Carpenter, 930 N. Portland, Gilbert, AZ (US) 85234; Jason Henley, Chandler, AZ (US)

(73) Assignee: Dale Carpenter, Gilbert, AZ (US)

( * ) Notice: Subject to any disclaimer, the term of this patent is extended or adjusted under 35 U.S.C. 154(b) by 203 days.

(21) Appl. No.: 11/429,893

(22) Filed: May 8, 2006

(65) Prior Publication Data

US 2007/0256743 A1    Nov. 8, 2007

(51) Int. Cl.
   *F16K 31/12*   (2006.01)
   *G05D 16/10*   (2006.01)
(52) U.S. Cl. .............. 137/505.25; 137/505.28; 251/322
(58) Field of Classification Search ............ 137/505.25, 137/505.28; 251/322, 323, 334, 339; 124/73, 124/74
See application file for complete search history.

(56) References Cited

U.S. PATENT DOCUMENTS

| | | | | |
|---|---|---|---|---|
| 2,675,649 A * | 4/1954 | Trevaskis et al. | ....... | 137/505.25 |
| 2,888,949 A | 6/1959 | Evans | | |
| 3,000,371 A * | 9/1961 | Hyde | ............ | 124/75 |
| 3,196,901 A * | 7/1965 | Phillipps | ............ | 137/505.25 |
| 3,407,841 A * | 10/1968 | Semon | ............ | 137/505.25 |
| 3,480,035 A | 11/1969 | Szanto | | |
| 3,486,522 A | 12/1969 | Ashman | | |
| 3,511,266 A | 5/1970 | Phlipot | | |
| 3,995,656 A | 12/1976 | Mills, Jr. | | |
| 4,015,630 A * | 4/1977 | Contreras | ............ | 137/505.25 |
| 4,173,986 A * | 11/1979 | Martin | ............ | 137/505.25 |
| 4,791,957 A * | 12/1988 | Ross | ............ | 137/505.25 |
| 4,887,638 A * | 12/1989 | Hellquist et al. | ........ | 137/505.13 |
| 5,135,023 A * | 8/1992 | Ross | ............ | 137/505.25 |
| 5,213,132 A * | 5/1993 | Comment | ............ | 137/505.25 |
| 5,509,407 A | 4/1996 | Schuler | | |
| 5,522,421 A * | 6/1996 | Holt et al. | ............ | 137/505.25 |
| 5,860,447 A * | 1/1999 | Chu | ............ | 137/505.25 |
| 5,996,625 A * | 12/1999 | Collado et al. | ........ | 137/505.25 |
| 6,056,006 A | 5/2000 | Hagerty | | |
| 6,321,779 B1 * | 11/2001 | Miller et al. | ............ | 137/505.25 |
| 6,363,964 B1 | 4/2002 | Carroll | | |
| 6,418,920 B1 | 7/2002 | Marr | | |
| 6,672,332 B2 | 1/2004 | Carroll | | |
| 6,851,447 B1 | 2/2005 | Carroll | | |
| 7,080,655 B2 * | 7/2006 | Jacksier et al. | ........ | 137/505.25 |
| 2003/0230296 A1 * | 12/2003 | Farrell | ............ | 124/73 |
| 2004/0200531 A1 | 10/2004 | Zuck | | |
| 2005/0082508 A1 * | 4/2005 | Dziob et al. | ............ | 251/323 |
| 2005/0103383 A1 | 5/2005 | Carroll | | |

* cited by examiner

*Primary Examiner*—Stephen M Hepperle
*Assistant Examiner*—Craig Price
(74) *Attorney, Agent, or Firm*—Letham Law Firm LLC; Lawrence Letham (57) ABSTRACT

Pressure regulators find uses in a variety of applications such as, for example, pneumatic tools, water systems, and paintball markers. Pressure regulators may substantially benefit from a separate seal carrier adapted to facilitate maintenance, improve performance, and open independent of piston movement; poppet bypass bores to increase regulated fluid flow; and, an outlet poppet adapted to operate independent of the piston.

17 Claims, 5 Drawing Sheets

METHOD AND APPARATUS FOR A PRESSURE REGULATOR

BACKGROUND OF THE INVENTION

1. Field of the Invention

This invention pertains generally to pressure regulators and in particular to pressure regulators for pressurized bottles adapted for paintball markers.

2. Description of Related Art

Pressure regulators find uses in a variety of applications such as, for example, pneumatic tools, water systems, and paintball markers. Pressure regulators may substantially benefit from a separate seal carrier adapted to facilitate maintenance, improve performance, and open independent of piston movement; poppet bypass bores to increase regulated fluid flow; and, an outlet poppet adapted to operate independent of the piston.

BRIEF SUMMARY OF THE INVENTION

Methods and apparatus according to various exemplary embodiments of the present invention comprise a body; an insert; a piston; a seal carrier adapted to seal the inlet and to move from a closed position to an open position independent of the piston; a poppet adapted to control regulated fluid flow, disposed in an outlet bore, and adapted to move independent of said piston; and, a poppet bypass bore adapted to provide increased regulated fluid flow. In an exemplary embodiment, the seal carrier is physically separate from the piston. Increased fluid pressure on the piston urges the piston into a piston closed position. The piston in turn contacts the seal carrier and urges the seal carrier into a seal carrier closed position. As fluid pressure decreases on the piston, the piston moves towards a piston open position and ceases to urge the seal carrier into a seal carrier closed position. Movement of the piston from the piston closed position towards the piston open position does not urge the seal carrier into the seal carrier open position. Pressure from high-pressure fluid at the inlet urges the seal carrier to move from the seal carrier closed position to the seal carrier open position independent of the piston.

BRIEF DESCRIPTION OF THE DRAWINGS

A more complete understanding of the present invention may be derived by referring to the detailed description and claims when considered in connection with the figures, wherein like reference numbers refer to similar elements throughout the figures, and:

DETAILED DESCRIPTION OF EXEMPLARY EMBODIMENTS

The accompanying drawings show exemplary embodiments by way of illustration and best mode. While these exemplary embodiments are described, other embodiments may be realized and changes may be made without departing from the spirit and scope of the invention. Thus, the detailed description is presented for purposes of illustration only and not of limitation. For example, the steps recited in any of the method or process descriptions may be executed in any suitable order and are not limited to the order presented.

For the sake of brevity, conventional mechanical techniques, manufacturing methods, mechanical connections, techniques for urging movement, seals, sealing materials, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. The present invention may be embodied as a customization of an existing system, an add-on product, or a distributed system.

The present invention is described partly in terms of functional components and various methods. Such functional components may be realized by any number of components configured to perform the specified functions and achieve the various results. In addition, the present invention may be practiced in conjunction with any number of applications and environments, and the systems described are merely exemplary applications of the invention. Further, the present invention may employ any number of conventional techniques for manufacture, testing, assembly, and the like.

Figure 3:
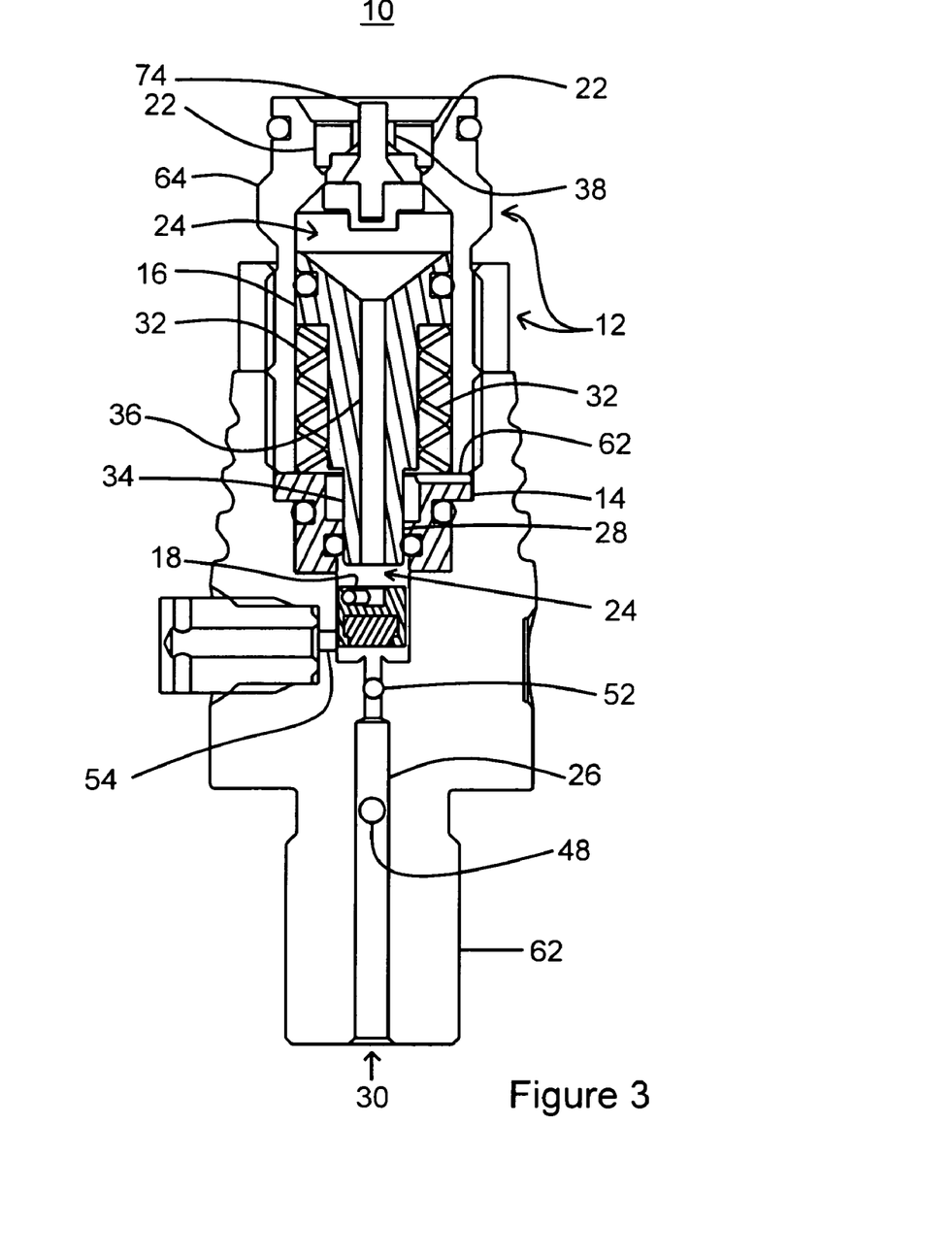
FIG. 3 is a cross-section diagram of an exemplary pressure regulator, taken along the line 3-3 of FIG. 2, showing the piston in the piston open position, the seal carrier in the seal carrier open position, and the poppet in the poppet closed position in accordance with one embodiment of the present invention.
Figure 4:
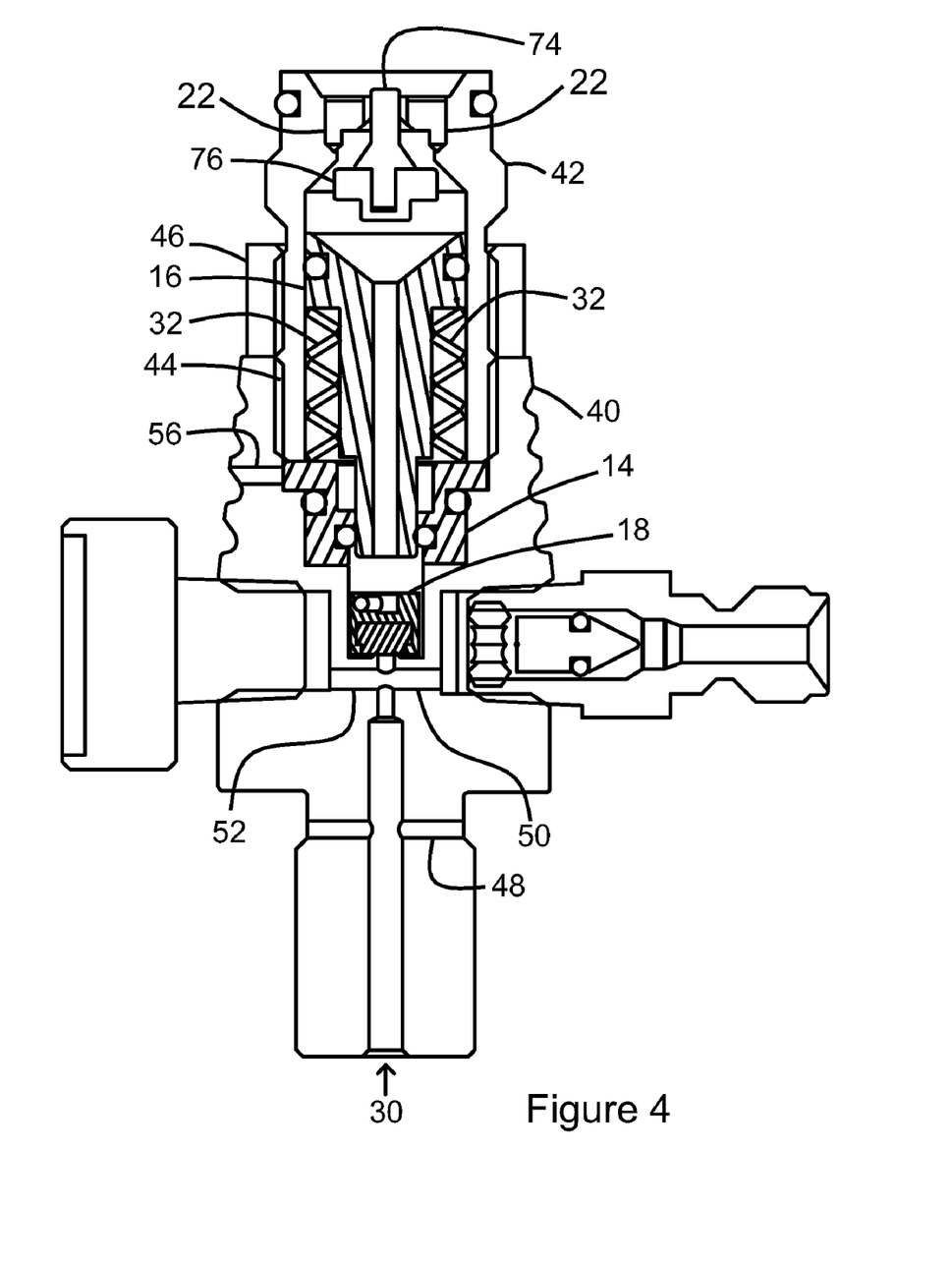
FIG. 4 is a cross-section diagram of an exemplary pressure regulator, taken along the line 4-4 of FIG. 1, showing the piston in the piston open position, the seal carrier in the seal carrier closed position, and the poppet in the poppet open position.

Methods and apparatus according to various exemplary embodiments of the present invention, pressure regulator 10, referring to FIGS. 3 and 4, comprise a body 12, an insert 14, a piston 16, a seal carrier 18, a poppet 20, and a poppet bypass bore 22. In an exemplary embodiment, a body cavity is separated into a regulated-pressure chamber 24 and a high-pressure chamber 26 by seal carrier 18. Seal carrier 18 is adapted to seal inlet 30 to stop the incoming flow of high-pressure fluid or to unseal inlet 30 to allow the flow of high-pressure fluid. Piston 16 is positioned in the regulated-pressure chamber 24. A portion of piston stem 34 passes through insert bore 28. Piston 16 is biased in a piston open position by piston spring 32 and moves to a piston closed position as fluid pressure increases in the regulated-pressure chamber. In the piston closed position, piston stem 34 contacts seal carrier 18 urging seal carrier 18 into the seal carrier closed position thereby sealing inlet 30. When fluid pressure in regulated-pressure chamber 24 decreases, piston 16 moves from the piston closed position to the piston open position. Movement of piston 16 from the piston closed position towards the piston open position does not urge seal carrier 18 to move. The pressure of the high-pressure fluid at inlet 30 urges seal carrier 18 to move from the seal carrier closed position to the seal carrier open position and not movement and/or force from piston 16. When piston 16 and seal carrier 18 are in their respective open positions, high-pressure fluid enters inlet 30 into the seal carrier portion of regulated-pressure chamber 24, passes through piston passage 36 into the piston portion of regulated-pressure chamber 24. As the pressure in regulated-pressure chamber 24 increases to the predetermined regulated pressure, piston 16, and in turn seal carrier 18, are urged into their respective closed positions. The exit of fluid from regulated-pressure chamber 24 is controlled by poppet 20. Poppet 20 is disposed in outlet bore 38 and is adapted to control the flow of fluid from regulated-pressure chamber 24. Outlet bore 38 is adapted to guide the movement of poppet 20 between a poppet open position and a poppet closed position. Poppet 20 does not contact piston 16. Movement of poppet 20 is guided by outlet bore 38 independent of piston passage 36. A spring, not shown in FIGS. 3-4, may extend from the head of piston 16 to poppet 20 to urge poppet 20 in a poppet closed position; however, the spring length and tension is selected such that movement in piston 16 does not affect the position of poppet 20 or induce movement in poppet 20. When poppet 20 is in the poppet open position, fluid flows from the exit of regulated-pressure chamber 24 out through outlet bore 38 and poppet bypass bore 22 to the device that uses regulated fluid. Poppet 20 is urged into a poppet open position by a force external to body 12 that acts on poppet 20.

Figure 1:
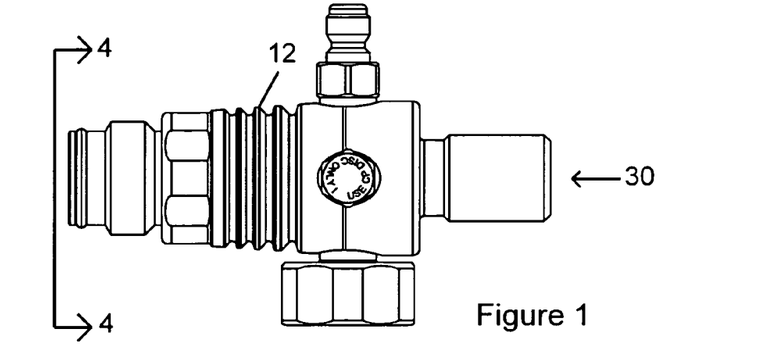
FIG. 1 is a side view diagram of an exemplary pressure regulator in accordance with one embodiment of the present invention.
Figure 2:
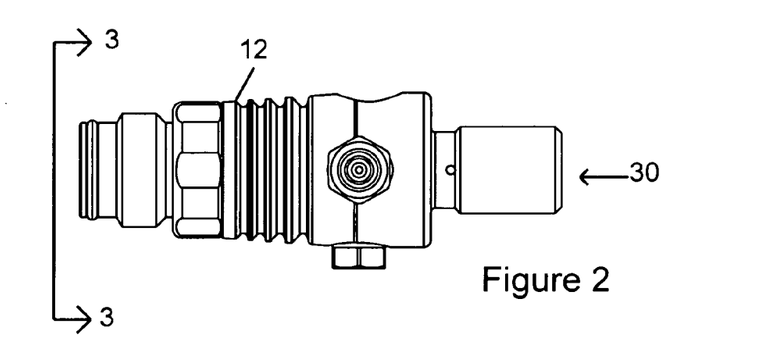
FIG. 2 is an alternate side view diagram of an exemplary pressure regulator in accordance with one embodiment of the present invention.
Figure 5:
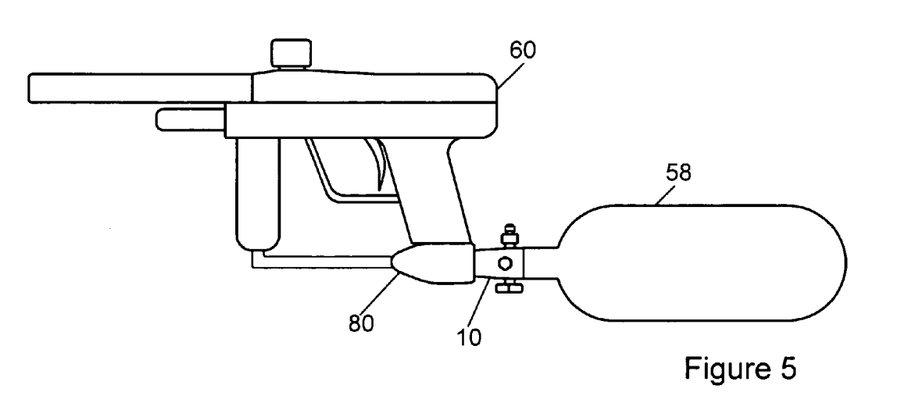
FIG. 5 is a diagram of an exemplary pressure regulator having its inlet connected to a high-pressure bottle and its outlet to a paintball marker in accordance with one embodiment of the present invention.

Body 12 may be formed in any manner, of any material, or any combination of materials. In an exemplary embodiment, referring to FIG. 4, body 12 is formed by threadedly connecting body top 42 to body base 40 using threads 44. Body top 42 is additionally secured to body base 40 using nut 46. Body 12 may have any number of openings. In an exemplary embodiment, body 12 has openings inlet 30, tank blow-off 48, fill nipple 50, pressure gauge 52, burst disk 54 (referring to FIG. 3), piston release 56, outlet bore 38, and poppet bypass bore 22. The body cavity may be of any size and/or shape and be divided into any number of pressure zones. In an exemplary embodiment, referring to FIG. 1, seal carrier 18 divides the body cavity into regulated-pressure chamber 24 and high-pressure chamber 26. In another embodiment, body cavity is divided into a high-pressure, medium-pressure, and regulated-pressure chambers. Pressure regulator 10 may interface with a fluid source and/or a device that uses regulated-pressure fluid in any manner. In an exemplary embodiment, referring to FIG. 3 and 5, body 12 of pressure regulator 10 threadedly connects to pressurized bottle 58 using male threads 62 and to paintball marker 60 using male threads 64. The connection between pressure regulator 10 and pressurized bottle 58 hermetically seals. In the event that the hermetic seal between body 12 and pressurized bottle 58 breaks, the fluid from pressurized bottle 58 exists through tank blow-off opening 48. In an exemplary embodiment, the connection between pressure regulator 10 and paintball marker 60 hermetically seals. Depressing poppet 20 allows regulated-pressure fluid to exit pressure regulator 10 into paintball marker 60. During disconnect of pressure regulator 10 from paintball marker 60, poppet 20 enters the poppet closed position and seals the exit from regulated-pressure chamber 24 before the hermetical seal with paintball marker 60 is broken.

Figure 6:
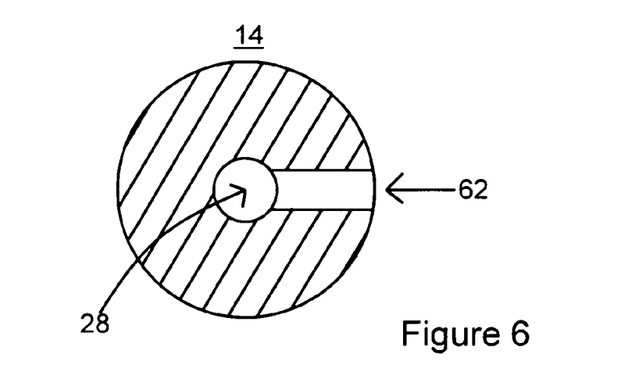
FIG. 6 is a top view diagram of an exemplary insert in accordance with one embodiment of the present invention.

Insert 14 be formed in any manner and of any material. It may be positioned in the body cavity at any location. In an exemplary embodiment, referring to FIGS. 3-4 and 6, insert 14 is positioned in the body cavity and divides regulated-pressure chamber 24 into a seal carrier portion and a piston portion. Seal carrier 18 is disposed in seal carrier portion of regulated-pressure chamber 24 while piston 16 is disposed in piston portion of regulated pressure chamber 24. Insert 14 limits the maximum possible movement of seal carrier 18 from the seal carrier closed position to the seal carrier open position. Referring to FIGS. 3 and 6, insert 14 has insert bore 28 therethrough adapted to slidably accept piston stem 34. Insert bore 28 facilitates the movement of piston stem 34 into the seal carrier portion of regulated-pressure chamber 24. When moving from the piston open position to the piston closed position, piston stem 34 passes through insert bore 28, contacts seal carrier 18, and urges seal carrier 18 into the seal carrier closed position. When piston 16 moves from the piston closed position towards the piston open position, piston stem 34 retracts at least to some extent from the seal carrier portion of regulated-pressure chamber 24, thereby releasing any force urging seal carrier 18 into the seal carrier closed position.

Insert 14 also has, referring to FIGS. 3 and 6, insert pressure release groove 62 to facilitate the escape of fluid from the portion of the body cavity occupied by spring 32 through piston release opening 56, referring to FIG. 4, during manufacture and/or assembly. Insert 14 may sealably contact the sides of the body cavity in any manner and/or piston stem 34 in any manner. In an exemplary embodiment, referring to FIG. 3-4, insert 14 sealably contacts the body cavity and piston stem 34 using o-rings. In an exemplary embodiment, referring to FIG. 3-4, insert 14 provides a floor to support spring 32. The force provided by spring 32 may be adjusted by adjusting the size of insert 14, for example, increasing the thickness of insert 14 increases the tension of spring 32 and results in a higher regulated fluid pressure. Conversely, decreasing the thickness of insert 14 decreases the tension of spring 32, thereby reducing the regulated fluid pressure. The size of insert 14 may also be adjusted to reduce or increase the size of the seal carrier portion of regulated-pressure chamber 24 and thereby increasing or decreasing the travel distance from the seal carrier closed position to the maximum limit of the seal carrier open position. During assembly and/or repair, insert 14 may be removed to provide access to seal carrier 18.

Figure 7:
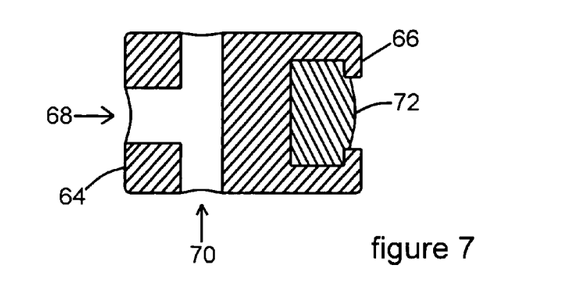
FIG. 7 is a cross-section diagram of an exemplary seal carrier from FIG. 4 in accordance with one embodiment of the present invention.
Figure 8:
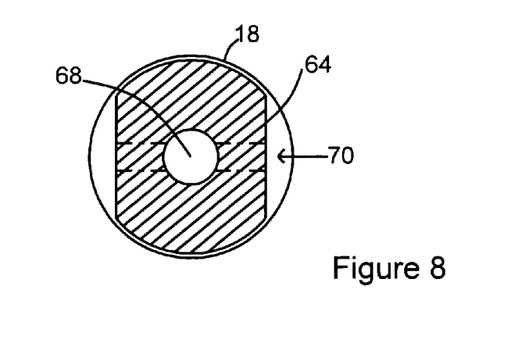
FIG. 8 is a diagram of an exemplary seal carrier disposed in the regulated-pressure chamber in accordance with one embodiment of the present invention.

Seal carrier 18 may be of any shape, size, or configuration to provide the desired results. Seal carrier 18 may be made of any material and/or combination of materials. In an exemplary embodiment, referring to FIGS. 3-4 and 7, seal carrier 18 comprises piston contact end 64, seal end 66, end bore 68, and side bore 70. Seal end 66 is adapted to seal inlet 30. In an exemplary embodiment, seal end 66 includes inlet seal 72. Inlet seal 72 may be made of any material adapted to seal high-pressure fluid flow. In an exemplary embodiment, inlet seal 72 is urethane. Inlet seal may be attached to seal end 66 in any manner. In an exemplary embodiment, a cavity in seal end 66 is filled with liquid urethane and cured. In another embodiment, a disk of urethane is attached to seal end 66. In the seal carrier closed position, inlet seal 72 seals inlet 30, thereby stopping the flow of high-pressure fluid into regulated-pressure chamber 24. In the seal carrier open position, seal carrier 18 enables fluid communication between regulated-pressure chamber 24 and high-pressure chamber 26. In an exemplary embodiment, referring to FIGS. 3-4, 7-8, seal carrier 18 is generally cylindrical in shape with at least one flat side. Side bore 70 enters the flat side and establishes fluid communication with end bore 68. End bore 68 enters piston contact end 64, partially penetrates seal carrier 18, and establishes fluid communication with side bore 70. In an exemplary embodiment, when seal carrier 18 leaves the seal carrier closed position, high-pressure fluid enters inlet 30, passes between the flat side of seal carrier 18 and the inner wall of the seal carrier portion of regulated-pressure chamber 24, enters side bore 70, exits end bore 68, enters the stem end of piston 16, passes through piston passage 36, and exists into the piston portion of regulated-pressure chamber 24.

Seal carrier 18 is physically separate from piston 16. Piston contact end 64 is adapted to interface with piston stem 34, but is physically separate from piston stem 34. Piston stem 34 contacts piston contact end 64 as piston 16 moves from the piston open position towards the piston closed position and urges seal carrier 18 into the seal carrier closed position. When piston 16 moves from the piston closed position towards the piston open position, high-pressure fluid at inlet 30 urges seal carrier 18 from the seal carrier closed position towards the seal carrier open position independent of piston 16. In an embodiment where piston 16 moves away from the piston closed position at a rate slower than seal carrier 18 moves away from the seal carrier closed position, the position of piston stem 34 may limit the rate of movement of seal carrier 18 as it moves from the seal carrier closed position towards the seal carrier open position. However, piston 16 does not provide the force that urges seal carrier 18 movement from seal carrier closed position to seal carrier open position. High-pressure fluid at inlet 30 provides the force necessary to urge seal carrier 18 from seal carrier closed position towards seal carrier open position. In an embodiment where piston 16 moves away from the piston closed position at a rate faster than seal carrier 18 moves away from the seal carrier closed position, the movement of piston 16 exerts no influence on the movement of seal carrier 18 from the seal carrier closed position to the seal carrier open position. In a situation where the fluid pressure at inlet 30 decreases to a point insufficient to move seal carrier 18 out of the seal carrier closed position, movement of piston 16 out of the piston closed position leaves seal carrier 18 undisturbed.

Maintaining seal carrier 18 separate from piston 16 facilitates pressure regulator 10 maintenance and reduces cost because inlet seal 72, the part most prone to failure, may be replaced simply by replacing seal carrier 18 and not piston 16. Additionally, separating seal carrier 18 from piston 16 results in a smaller, lighter-weight piston 16 that reacts more quickly to changes in pressure, thereby making the regulator more responsive. Furthermore, the size and weight of seal carrier 18 may be determined independent of the characteristics of piston 16. Seal carrier 18 may be made larger to better seal inlet 30 while piston 16 remains lighter weight and more responsive. Seal carrier 18 may be formed of a durable material to withstand repeated contact with piston stem 34 when piston 16 urges seal carrier into the seal carrier closed position. In an exemplary embodiment, seal carrier 18 is stainless steel. The contact between piston stem 34 and piston contact end 64 may or may not be hermetic. In an exemplary embodiment, piston stem 34 is made of aluminum, piston contact end 64 is stainless steel, and contact between piston stem 34 and piston contact end 64 is not hermetic.

Piston 16 may be of any shape, size, or configuration to provide the desired results. In an exemplary embodiment, referring to FIGS. 3-4, the head of piston 16 is a concave conical shape to provide additional surface area to react with fluid pressure. Piston passage 36 passes through piston 16 and is open at both ends. Spring 32 urges piston 16 into a piston open position. Gas pressure in regulated-pressure chamber 24 urges piston 16 into the piston closed position. When the fluid force in regulated-pressure chamber 24 is greater than the force exerted by spring 32, the piston moves into the piston closed position and urges seal carrier 18 into the seal carrier closed position. Piston stem 34 may be of any shape or thickness. In an exemplary embodiment, referring to FIGS. 3-4, the diameter of piston stem 34 nearer insert 14 decreases to reduce piston 16 weight and to reduce the area exposed to high-pressure fluid entering the seal carrier portion of regulated-pressure chamber 24. Reducing the piston stem 34 area exposed to high-pressure fluid improves pressure regulator 10 operation at lower pressures and decreases fluctuations in the regulated pressure due to the fluctuations in the high-pressure fluid pressure. Piston 16 may be made of any material and in any manner suitable to the application. The pressure of the regulated fluid may be adjusted by modifying the length of piston stem 34. In an exemplary embodiment, increasing the length of piston stem 34 decreases the pressure of the regulated fluid while decreasing the length of piston stem 34 increases the pressure of the regulated fluid. Any force may be used to urge piston 16 into the piston open position. In an exemplary embodiment, referring to FIGS. 3-4, spring 32 urges piston 16 into the piston open position.

Figure 9:
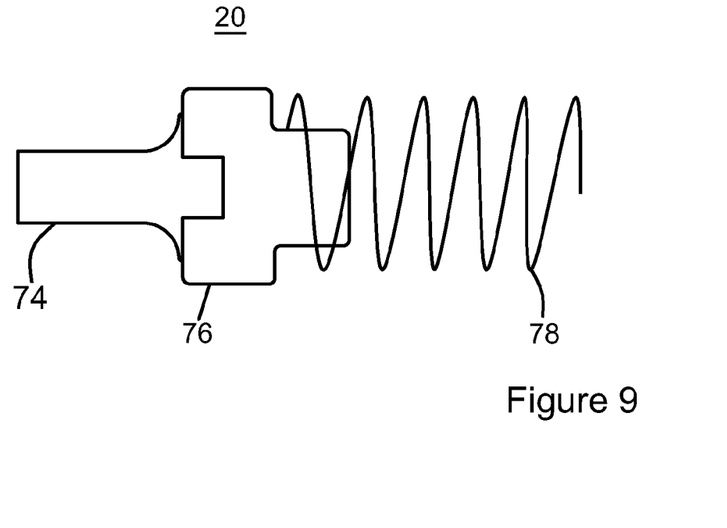
FIG. 9 is a diagram of an exemplary poppet in accordance with one embodiment of the present invention.

Poppet 20 may be of any shape, size, or configuration to provide the desired results. In one embodiment, referring to FIG. 9, poppet 20 comprises poppet pin 74, poppet seal 76, and poppet spring 78. Poppet pin 74 is slidably disposed in outlet bore 38. The length and diameter of outlet bore 38 is configured to guide the movement of poppet pin 74 such that poppet seal 76 seals regulated-pressure chamber 24. Poppet seal 76 may be of any material suitable for the application. In an exemplary embodiment, poppet seal 76 is nylar. In another embodiment, poppet seal 76 is an o-ring. Making the diameter of outlet bore 38 larger than the diameter of poppet pin 74 increases the amount of regulated air that may pass between the poppet pin 74 and the outlet bore 38 thereby providing increased flow of regulated fluid; however, increasing the diameter of outlet bore 38 as compared to the diameter of poppet pin 74 increases the likelihood of poppet pin 74 moving angularly in outlet bore 38 instead of primarily axially thereby jamming the movement of poppet 20 and/or requiring the sealing surface of poppet seal 76 to be increased in size to seal regardless of the position of poppet pin 74. Increasing the length of outlet bore 38 increases the length over which outlet bore 38 may direct the movement of poppet pin 74, thereby increasing repeatability of motion and sealing. When the diameter of outlet bore 38 is made to be only slightly larger than the diameter of poppet pin 74, poppet 20 moves axially, its movement guided by outlet bore 38, and poppet seal 76 consistently seals, but the amount of regulated fluid that passes between outlet bore 38 and poppet pin 74 is reduced possibly to a rate of flow that is not desirable. Poppet bypass bore 22, as discussed below, provides increased regulated fluid flow when outlet bore 38 is configured to guide poppet pin 74 as opposed to provide a high level of regulated fluid flow. In an exemplary embodiment, outlet bore 38 is configured to primarily guide the movement of poppet 20 and not to provide substantial regulated fluid flow. In an exemplary embodiment, the diameter of outlet bore 38 is 94/1000 inches and the diameter of poppet pin 74 is 91/1000 inches. In an exemplary embodiment, poppet 20 moves free from contact with and/or guidance from piston 16 and/or piston passage 36. The movement of poppet 20 is guided by outlet bore 38 and not by piston 16 and/or piston passage 36. Configuring poppet 20 to move independent of piston 16 increases reliability of operation by reducing interactions between moving parts. Additionally, using an embodiment where outlet bore 38 guides the movement of poppet 20, as opposed to, for example, piston passage 36, reduces the design requirements of piston 16, thereby allowing piston 16 to be configured for speed of movement and lightness of weight.

Figure 10:
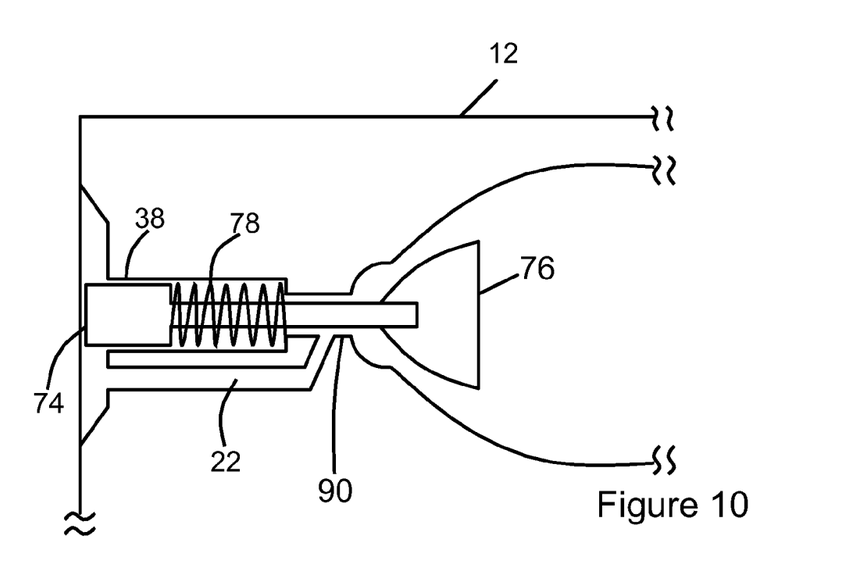
FIG. 10 is a diagram of an alternate embodiment of a poppet in accordance with one embodiment of the present invention.

Poppet 20 may be configured to seal regulated chamber 24 in any manner. In an exemplary embodiment, referring to FIGS. 3-4 and 10, poppet seal 76 is configured to seal the exit from regulated-pressure chamber 24 that leads to outlet bore 38 and poppet bypass bore 22. Poppet 20 may be urged into the poppet closed position in any manner. In an exemplary embodiment, referring to FIG. 9, poppet spring 78 applies force against poppet 20 urging poppet 20 into the poppet closed position. In the poppet closed position, poppet seal 76 seals the exit 90 to regulated-pressure chamber 24. Poppet spring 78 may provide force to poppet 20 by pressing against any part of pressure regulator 10. In an exemplary embodiment, poppet spring 78 extends between poppet 20 and piston 16. In another embodiment, referring to FIG. 10, poppet spring 78 presses against the outlet bore 38. Poppet 20 may be urged into the poppet open position in any manner. In an exemplary embodiment, pressure regulator 10 connects to the air source adapter ("ASA") 80 of paintball marker 60. ASA 80 is configured with a pin that presses against poppet 20 and holds poppet 20 in the poppet open position while pressure regulator 10 is connected to ASA 80. As pressure regulator 10 is disconnected from ASA 80, the ASA pin moves away from pressure regulator 10, thereby enabling poppet 20 to move into the poppet closed position. The movement of poppet 20 between the poppet closed position and the poppet open position may be dynamic. The device that uses regulated-pressure fluid may force poppet 20 into the poppet open position at any time and may release poppet 20 thereby allowing poppet 20 to return to the poppet closed position at any time.

Regarding poppet bypass bore 22. For some applications, a high level of flow of regulated fluid is desirable. For example, the operation of a paintball marker may benefit from an increased volume of regulated fluid flow. Regulated fluid flow may be increased by configuring pressure regulator 10 with at least one poppet bypass bore 22. Poppet bypass bore 22 may be any size and configured in any manner. In an exemplary embodiment, referring to FIGS. 1, 3 and 10, poppet bypass bore 22 provides a conduit for regulated fluid flow from the exit of regulated-pressure chamber 24 around poppet 20 to the device that uses regulated fluid. In the poppet closed position, no fluid exits regulated-pressure chamber 24. In the poppet open position, regulated fluid exits regulated-pressure chamber 24, enters both outlet bore 38 and poppet bypass bore 22, and exits both outlet bore 38 and poppet bypass bore 22 to the device that uses regulated fluid. Poppet bypass bore 22 may be configured to be significantly larger than the fluid passage between the sides of outlet bore 38 and poppet pin 74. Poppet bypass bore 22 may be configured to provide a lower resistance and/or higher volume path for fluid flow as compared to the path between the sides of outlet bore 38 and poppet pin 74. In an exemplary embodiment, the diameter of poppet bypass bore 22 is at least as large as the diameter of outlet bore 38 and is free from any obstructions that may decrease the effective diameter or restrict flow. In an exemplary embodiment, the diameter of the exit from regulated-pressure chamber 24 is 209/1000 inches, the diameter of the poppet bypass bore 22 is 94/1000 inches, the diameter of the outlet bore 38 is 94/1000 inches, and the diameter of poppet pin 74 that is disposed in outlet bore 38 is 91/1000 inches. The area of the exit opening, poppet bypass bore 22 opening, outlet bore 38 opening, and poppet pin 74 are $34.31\times10^{-3}$ inches$^2$, $6.94\times10^{-3}$ inches$^2$, $6.94\times10^{-3}$ inches$^2$, and $6.50\times10^{-3}$ inches$^2$ respectively. Disposing poppet pin 74 into outlet bore 38 leaves a remaining area of only $0.44\times10^{-3}$ inches$^2$ for regulated fluid flow between the sides of outlet bore 38 and poppet pin 74 as compared to the $6.94\times10^{-3}$ inches$^2$ available for fluid flow through poppet bypass bore 22. In another embodiment, fluid regulator comprises four poppet bypass bores 22, thus the area available through poppet bypass bores 22 for regulated fluid flow is $27.76\times10^{-3}$ inches$^2$ as compared to $0.44\times10^{-3}$ inches$^2$ through outlet bore 38 past poppet pin 74. Poppet bypass bore 22 may be configured to provide significantly more area for regulated fluid flow than between the sides of outlet bore 38 and poppet pin 74; thus, outlet bore 38 may be configured to guide and control the movement of poppet 20 for reliable operation even though regulated air flow through outlet bore 38 may be significantly reduced and/or completely restricted because poppet bypass bore 22 provides a large, unobstructed path for regulated fluid flow. In another embodiment, the area provided by poppet bypass bore 22 for regulated fluid flow is at least as great as the area of the exit from regulated-pressure chamber 24.

Although the description above contains many details, these should not be construed as limiting the scope of the invention but as merely providing illustrations of some of the exemplary embodiments of this invention. The scope of the present invention fully encompasses other embodiments, and is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments are expressly incorporated by reference and are intended, unless otherwise specified, to be encompassed by the claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. No claim element is to be construed under the provisions of 35 U.S.C. 112, sixth paragraph, unless the element is expressly recited using the phrase "means for." The terms "comprises", "comprising", or any other variation, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for regulating fluid pressure, comprising:
   a body having a cavity, an inlet, an exit, and an outlet bore, the inlet and the exit having sealable fluid communication with the cavity;
   an insert having an insert bore therethrough, the insert positioned in the cavity thereby forming a piston portion and a seal carrier portion of the cavity;
   a seal carrier having a seal end, a piston contact end, a side bore, and an end bore, the end bore open at the piston contact end and partially penetrating the seal carrier, the side bore in fluid communication with the end bore, the seal carrier slidably positioned in the seal carrier portion, the seal carrier being moveable between a seal carrier open position and a seal carrier closed position, wherein while the seal carrier is positioned in the seal carrier closed position the seal end contacts and seals the inlet to stop a flow of fluid into the cavity;

a piston having a stem and a piston passage open at both ends, the piston slidably mounted in the piston portion, the stem slidably mounted in the insert bore, the piston biased in a piston open position and moveable to a piston closed position in response to increased fluid pressure on the piston, wherein while in the piston closed position the stem contacts the piston contact end without sealing the passage and urges the seal carrier into the seal carrier closed position, while in the piston open position the seal carrier slidably moves, independent of the piston, into the seal carrier open position whereby the seal end releases contact with the inlet and permits the flow of fluid into the cavity, and the piston is separate from the seal carrier;

a poppet slidably mounted in the outlet bore, the poppet biased in a poppet closed position and moveable to a poppet open position, wherein while the poppet is positioned in the poppet closed position the poppet seals the exit, the outlet bore guides a movement of the poppet, the poppet moves independent of guidance and contact from the piston; and a poppet bypass bore, wherein while in the poppet open position the exit is in fluid communication with the outlet and the poppet bypass bore.

2. The apparatus of claim 1 comprising four poppet bypass bores.

3. The apparatus of claim 1 wherein the seal carrier is positioned between the piston passage and the inlet.

4. The apparatus of claim 1 wherein the piston passage comprises a single, straight, axial passage.

5. The apparatus of claim 1 wherein the seal carrier comprises a generally cylindrical shape having a flat side, and the side bore enters the flat side and forms fluid communication with the end bore.

6. The apparatus of claim 1 the seal carrier further comprises an inlet seal having a face wherein the inlet seal couples to the seal end, the inlet seal hermetically seals the inlet while the seal carrier is positioned in the seal carrier closed position, and only the face of the inlet seal is exposed to fluid.

7. The apparatus of claim 1 wherein the passage is in continuous fluid communication with the seal carrier portion of the cavity.

8. An apparatus for regulating fluid pressure, comprising:
a body having a cavity, an inlet, and an outlet bore, the inlet and the outlet bore having sealable fluid communication with the cavity;
a seal carrier having a seal end and a piston contact end, the seal carrier moveable between a seal carrier open position and a seal carrier closed position, while the seal carrier is positioned in the seal carrier closed position the seal end contacts and seals the inlet to stop a flow of fluid into the cavity;
a piston having a stem and a piston passage open at both ends, the piston biased in a piston open position and moveable to a piston closed position in response to increased fluid pressure on the piston, wherein while in the piston closed position the stem contacts the piston contact end without sealing the passage and urges the seal carrier into the seal carrier closed position, while in the piston open position the seal carrier slidably moves, independent of the piston, into the seal carrier open position whereby the seal end releases contact with the inlet and permits the flow of fluid into the cavity, and the piston is separate from the seal carrier; and
a poppet slidably mounted in the outlet bore, the poppet biased in a poppet closed position and being moveable to a poppet open position, wherein while in the poppet closed position the poppet seals the outlet bore, the outlet bore guides a movement of the poppet, and the poppet moves independent of guidance and contact from the piston.

9. An apparatus for controlling a flow of fluid, comprising:
an inlet;
a seal carrier having a seal end and a piston contact end, the seal carrier moveable between a seal carrier open position and a seal carrier closed position, wherein while the seal carrier is positioned in the seal carrier closed position the seal end contacts and seals the inlet to stop the flow of fluid through the inlet;
a piston having a stem, a head and a straight, axial passage therethrough, the passage open at an end portion of the stem and the head, the piston biased in a piston open position and moveable to a piston closed position in response to increased fluid pressure on the head, wherein while in the piston closed position the end portion of the stem contacts the piston contact end without sealing the passage and urges the seal carrier into the seal carrier closed position, while in the piston open position the seal carrier slidably moves, independent of the piston, into the seal carrier open position whereby the seal end releases contact with the inlet and permits the flow of fluid through the inlet, and the piston is separate from the seal carrier.

10. The apparatus of claim 9 wherein the seal carrier is positioned between the end portion of the stem and the inlet.

11. The apparatus of claim 9 wherein while in the piston closed position, the piston contact end covers the opening of the passage at the end portion of the stem, but does not seal the passage.

12. The apparatus of claim 9 the seal carrier further comprises an inlet seal having a face, wherein the inlet seal couples to the seal end, the inlet seal hermetically seals the inlet while the seal carrier is positioned in the seal carrier closed position, and only the face of the inlet seal is exposed to fluid.

13. The apparatus of claim 9 wherein the seal carrier further comprises a side bore and an end bore, wherein the end bore opens at the piston contact end and partially penetrates the seal carrier, the side bore opens at least one side of the seal carrier, and the end bore is in continuous fluid communication with the side bore.

14. An apparatus for regulating fluid pressure, comprising:
a body having a cavity, an inlet, and an outlet bore, the inlet and the outlet bore having sealable fluid communication with the cavity;
a piston having a stem, a head, and a straight, axial passage therethrough, the piston positioned in the cavity, the passage open at an end portion of the stem and the head, the piston biased in a piston open position and moveable to a piston closed position in response to increased fluid pressure on the head; and
a seal carrier separate from the piston and having a seal end portion, a contact end portion, a side bore and an end bore, the seal carrier positioned in the cavity between the end portion of the stem and the inlet, the seal carrier moveable between a seal carrier open position responsive to a flow of high pressure fluid into the cavity and a seal carrier closed position responsive to a movement of the piston; wherein:
the end bore opens at the contact end portion and partially penetrates the seal carrier;
the side bore opens at a side of the seal carrier,
the cavity, the passage, the end bore, and the side bore are in continuous fluid communication;

while the piston moves from the piston open position to the piston closed position and the seal carrier is not positioned in the seal carrier closed position:
  the end portion of the stem contacts the contact portion of the seal carrier;
  the contact portion of the seal carrier does not seal the passage;
  the piston moves the seal carrier towards the seal carrier closed position; and
  the cavity is in fluid communication with the inlet;
while the piston is positioned in the piston closed position:
  the end portion of the stem contacts the contact portion of the seal carrier and holds the seal carrier in the seal carrier closed position; and
  the contact portion of the seal carrier does not seal the passage;
while the seal carrier is positioned in the seal carrier closed position, the seal end contacts and seals the inlet thereby stopping the flow of high pressure fluid into the cavity; and
while the piston is not positioned in the piston closed position the seal carrier moves independent of the piston from the seal carrier closed position to the seal carrier open position responsive to the flow of high pressure fluid into the cavity.

15. An apparatus of claim 14 further comprising a poppet slidably mounted in the outlet bore, biased in a poppet closed position and moveable to a poppet open position responsive to a force, wherein:
  while the poppet is positioned in the poppet closed position, the poppet seals the outlet bore from the cavity;
  the poppet moves independent of the movement of the piston; and
  the outlet bore guides the movement of the poppet between the poppet open position and poppet closed position.

16. An apparatus of claim 15 further comprising a poppet bypass bore, wherein while the poppet is positioned in:
  the poppet open position, the poppet bypass bore is in fluid communication with the cavity; and
  the poppet closed position, the poppet bypass bore is not in fluid communication with the cavity.

17. The apparatus of claim 14 wherein the seal carrier further comprises a seal positioned on the seal end portion.

* * * * *